(12) United States Patent
Ballard (10) Patent No.: US 7,086,304 B2
(45) Date of Patent: *Aug. 8, 2006

(54) ROLLER CAM ASSEMBLY (76) Inventor: Richard N. Ballard, 5240 Miami Rd., Cincinnati, OH (US) 45243

( * ) Notice: Subject to any disclaimer, the term of this patent is extended or adjusted under 35 U.S.C. 154(b) by 38 days.

This patent is subject to a terminal disclaimer.

(21) Appl. No.: 10/889,876

(22) Filed: Jul. 13, 2004

(65) Prior Publication Data
US 2004/0244522 A1 Dec. 9, 2004

Related U.S. Application Data (63) Continuation of application No. 10/121,099, filed on Apr. 11, 2002, now Pat. No. 6,902,507.

(51) Int. Cl.
F16H 55/06 (2006.01)

(52) U.S. Cl. .......................... 74/465; 74/415

(58) Field of Classification Search ............. 74/415, 74/465, 89.11, 89.1, 109; 475/168, 180
See application file for complete search history.

(56) References Cited

U.S. PATENT DOCUMENTS

| | | | | |
|---|---|---|---|---|
| 1,199,398 A | * | 9/1916 | Loftus | 74/465 |
| 1,444,717 A | * | 2/1923 | Webb | 475/168 |
| RE17,811 E | * | 9/1930 | Braren | 475/168 |
| 1,847,591 A | * | 3/1932 | Büttner | 475/168 |
| 3,783,712 A | * | 1/1974 | Colinet | 475/168 |
| 3,998,112 A | * | 12/1976 | Pierrat | 475/168 |
| 4,023,440 A | * | 5/1977 | Kennington et al. | 475/168 |
| 4,271,726 A | * | 6/1981 | Ryffel | 475/168 |
| 4,526,064 A | * | 7/1985 | Carden et al. | 475/168 |
| 4,549,450 A | * | 10/1985 | Pierrat | 475/168 |
| 4,584,904 A | * | 4/1986 | Distin, Jr. et al. | 475/168 |
| 4,604,916 A | * | 8/1986 | Distin, Jr. | 475/168 |
| 4,643,047 A | * | 2/1987 | Distin et al. | 475/168 |
| 4,658,675 A | * | 4/1987 | Murray | 475/168 |
| 5,188,572 A | * | 2/1993 | Yamaguchi et al. | 475/168 |
| 5,247,847 A | * | 9/1993 | Gu | 74/465 |
| 5,292,289 A | | 3/1994 | Ogata et al. | |
| 5,695,425 A | * | 12/1997 | Hashimoto et al. | 475/180 |
| 5,707,310 A | * | 1/1998 | Maeguchi et al. | 475/180 |
| 6,023,989 A | * | 2/2000 | Imase et al. | 74/422 |

OTHER PUBLICATIONS

Office Action dated Jun. 17, 2003, for U.S. Appl. No. 10/121,099, filed Apr. 11, 2002.
Office Action dated Dec. 23, 2003, for U.S. Appl. No. 10/121,099, filed Apr. 11, 2002.

(Continued)

Primary Examiner—David Fenstermacher
(74) Attorney, Agent, or Firm—Frost Brown Todd LLC (57) ABSTRACT A transmission comprises a pair of drive shafts, one an input shaft and the other an output shaft, wherein one of said shafts is attached to a toothed cam having a trochoidal profile and the other drive shaft is attached to a roller ring having a plurality of cylindrical roller shafts aligned to mesh with said toothed cam and thereby permitting the transfer of torque from one shaft to the other.

20 Claims, 10 Drawing Sheets

OTHER PUBLICATIONS

Office Action dated Mar. 19, 2004, for U.S. Appl. No. 10/121,099, filed Apr. 11, 2002.
Office Action dated May 24, 2004, for U.S. Appl. No. 10/121,099, filed Apr. 11, 2002.
Office Action dated Nov. 2, 2004, for U.S. Appl. No. 10/121,099, filed Apr. 11, 2002.
Advisory Action dated Jan. 6, 2005, for U.S. Appl. No. 10/121,099, filed Apr. 11, 2002.

* cited by examiner

ROLLER CAM ASSEMBLY

This application is a continuation of prior U.S. Non-Provisional patent application Ser. No. 10/121,099, filed Apr. 11, 2002 now U.S. Pat. No. 6,902,507, entitled ROLLER CAM ASSEMBLY.

BACKGROUND OF THE INVENTION

Early prime movers or power sources such as the mill stream water wheel; and, later the steam engine, created a need for transferring power from one place to another through torque transfer. An early example of torque transfer was the belt and pulley assembly, frequently utilized in machine shops to drive various machines.

The early prime movers generated low revolutions per minute (rpm) and mechanically simple torque transfer mechanisms were capable of creating very little power. In portable machines, chains and sprockets are often used to transfer power. The most common example of this form of torque transfer is the ordinary bicycle. The bicycle sprocket and chain are a roller cam assembly; and the relative motion between the roller in the chain and the sprocket is that of an involute. It is the shape of the sprocket that enables the power to be transferred smoothly.

With the need to transfer torque between adjacent parallel and perpendicular shafts, something else had to be devised. In fact, the old water wheels that were used to grind grain employed wooden pegs as gear teeth to transfer torque; but, as rpm and torque increased, it was observed that a fluctuation in speeds occurred, creating destructive forces. This fluctuation resulted from the variations during rotation of the effective radii between the meshing of the pegged wheels.

The variation of the effective radii was a result of the shape of the pegs. The first solution was to develop a double cycloid tooth with a convex shape above the pitch circle and a concave shape below the pitch circle. These gears looked something like a plurality of rollers evenly spaced with their axes parallel to the input shaft and attached to the surface of a wheel. If two concave arcs were placed near the point of attachment and the surface of the wheel, it would create a tooth that resembled the teeth used in these gears. This design solved the velocity fluctuations. However, the gears were difficult to manufacture and their shape made them highly susceptible to failure.

In the latter part of the nineteenth century, the involute gear was developed. It was both much stronger and cheaper to make. In calculations of gear strength, the teeth were treated as a series of cantilevered beams, and an engineer named Lewis devised a table of values called the Lewis Form Factor that simplified calculations of torque capacity of spur gears. This table is used in calculations today.

FIELD OF THE INVENTION

The present invention utilizes the parameters of existing spur gears such as a choice of pitch and pitch circle in a meshing "roller ring-toothed cam" configuration that employs roller action as opposed to the high-friction sliding action of spur gear. In the present invention, it is the trochoidal shape that eliminates the interference between meshing members. This configuration permits fewer, larger and stronger teeth in the smaller meshing member and allows the design of smaller, stronger and more compact gear trains. Fewer, larger teeth are possible because the shape of the cam tooth is determined by the relative motion between rotating bodies.

A roller ring-toothed cam combination can be designed with external meshing members, internal meshing members, bevel gear arrangements and rack and pinion combinations. In all of these proposed assemblies, either the larger or the smaller member can be the roller ring or the toothed cam. The point to be made here is that any of the roller ring-toothed cam assemblies disclosed herein will permit the design of compact, high-strength gear trains with very high train values and pure rolling contact.

DESCRIPTION OF THE PRIOR ART

In U.S. Pat. No. Re. 17,811 issued Sep. 23, 1930, the inventor identified the point on the cam shape where the shape changes from concave to convex.

He noted that this point on the curve would carry the load, caused by the contact of the roller for a longer period of time. To overcome this dwell problem, he utilized a prolate trochoid curve where the generating point is three-fourths the distance from the center of the generating circle compared to the radius of the generating circle. This distance must also equal the eccentricity of the crank. The dwell point is a point on the cam that has a zero radius of curvature and this point cannot support loads without deteriorating the cam. For this reason, cycloidal curves should not be used in roller cams. By locating the generating point so far from the surface of the generating pitch circle, the effective component of the forces between the roller and the cam is greatly reduced, thereby severely limiting the capacity of this prior art mechanism to handle torque.

U.S. Pat. No. 5,247,847 dated Sep. 28, 1993 is particularly relevant to the instant disclosure. It describes the use of roller cams for external assemblies where the roller ring is always smaller; in a rack and pinion assembly where the roller ring is the pinion; and in a torque assembly where the roller cam is in a bevel gear design. The definition and description of the roller cams in this reference utilize a mathematical presentation with the line of centers being held constant and the two rotating members being rotated. This procedure follows the historical graphical procedure using conjugate curves. Furthermore, this procedure can develop the same shaped tooth that is created by the use of epicycloidal mathematics described herein. In the latter case, one of the pitch circles is held stationary while the line of centers and the other pitch circle, with the generating point, is allowed to rotate. In both cases, the tooth shapes generated are identical. The practical problem with these epicycloidal and cycloidal tooth shapes is that there is one point on the face of each tooth that has a zero-radius of curvature. And this point will not handle any forces without inflicting serious deterioration of the cam surface.

Two additional references that are somewhat relevant to the disclosed invention include U.S. Pat. No. 3,783,712 dated Jan. 8, 1974, which discloses a roller cam assembly employing a long arcing slot containing two suspended rollers that are separated by a wedge to fill the slot and transmit torque; and U.S. Pat. No. 4,604,916 dated Aug. 12, 1986, which uses a free floating set of rollers on a retaining ring as used in roller bearings. This ring of rollers has one more roller than the inner member has notches and one less roller than the outer member has notches and all rollers are in contact with both the inner member and the outer member at all times.

SUMMARY OF THE INVENTION

This invention discloses a transmission having a roller cam assembly that utilizes a pair of drive shafts, one an input shaft and the other an output shaft wherein one of said shafts is attached to a toothed cam having a trochoidal profile and the other drive shaft is attached to a roller ring having a plurality of attached cylindrical roller shafts aligned to mesh with said toothed cam and thereby permit the transfer of torque from one shaft to the other.

DESCRIPTION OF THE PREFERRED EMBODIMENTS

Figure 4:
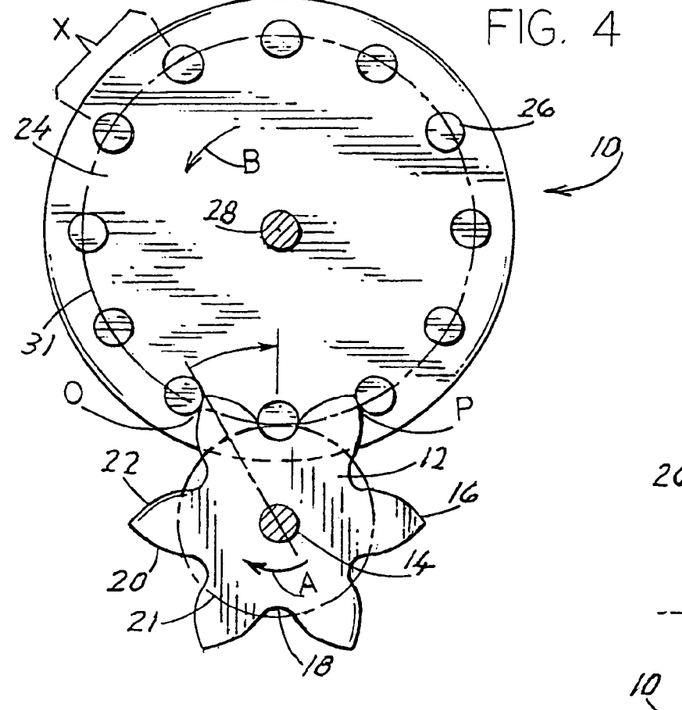
FIG. 4 is an elevated axial view of a prolate epitrochoidal cam and roller ring assembly wherein the axis of the cam is outside the pitch circle of the roller ring.
Figure 11:
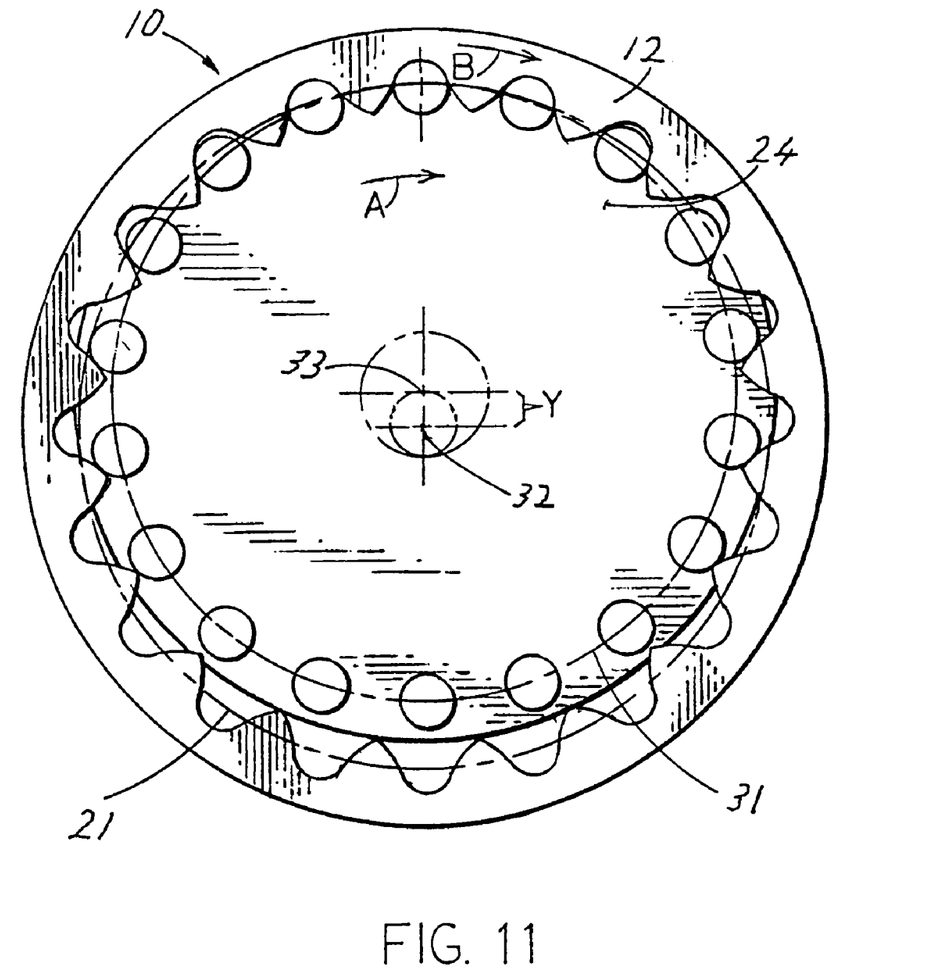
FIG. 11 is an elevated axial view of a prolate hypotrochoidal cam and roller ring assembly with an eccentric axle on the roller ring.
Figure 12:
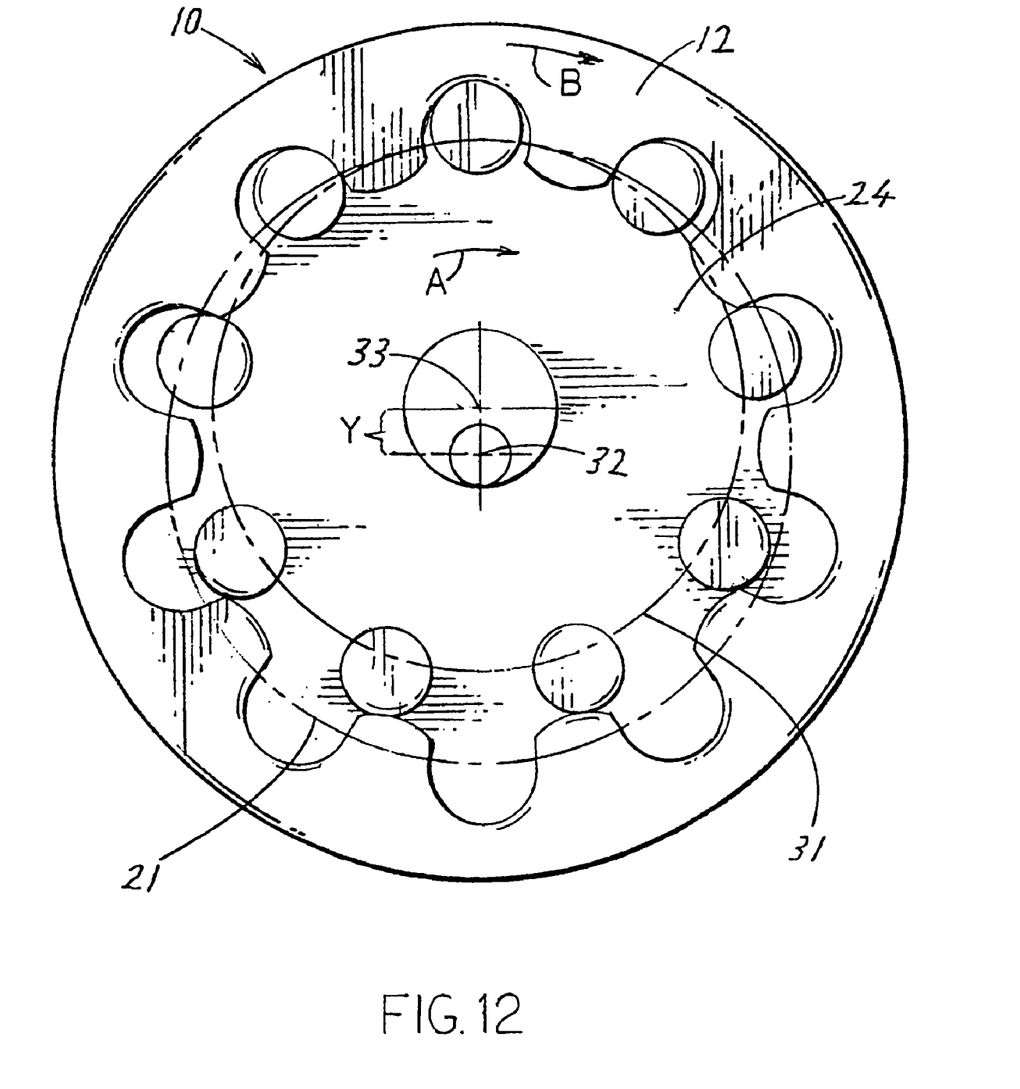
FIG. 12 is an elevated axial view of a curtate hypotrochoidal cam and roller ring assembly with an eccentric shaft on the roller ring.

An understanding of the disclosed roller cam assembly can be best appreciated by referring to the drawing. This disclosure describes four different types of trochoid cam profiles that can interact efficiently with appropriately matched roller ring assemblies. These cam profiles can be described either mathematically or mechanically. This document will do both. The cams can be located internal to the circumference of the roller ring assembly (see FIGS. 1 & 7). Or they can be located externally to the circumference of the roller ring assembly (see FIGS. 4 & 8). Additionally, the cam can also surround the roller ring as in FIGS. 9–12. When the cam is internal or external to the roller ring assembly, but not surrounding the roller ring assembly, it is an epitrochoid cam. In this disclosure, the cams and roller rings move the same as with the gears. The cam shape controls the relative motion between them so as to generate the same output as gears. Herein are described two types of epitrochoidal cams namely, curtate (FIG. 1) and prolate (FIG. 4). Similarly, we will describe two types of roller ring-surrounding cams namely, curtate hypotrochoidal (see FIGS. 10 & 12) and prolate hypotrochoidal (see FIGS. 9 & 11). Furthermore, the trochoidal cam and roller ring arrangement lends itself to use in epicyclic transmissions as depicted in FIGS. 11 & 12.

Figure 1:
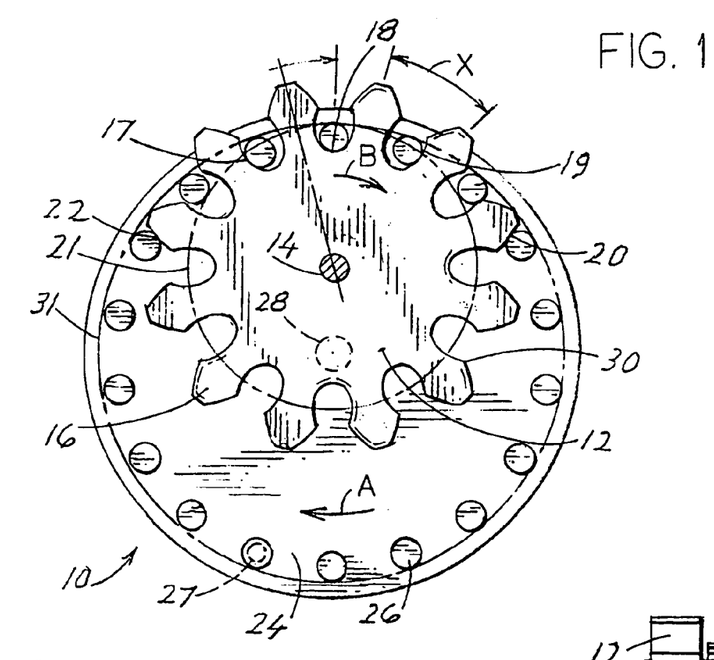
FIG. 1 is an elevated axial view of a curtate epitrochoidal cam and roller ring assembly wherein the axis of the cam is within or inside the pitch circle of the roller ring.

FIG. 1 shows an axial view of a curtate epitrochoidal cam and roller ring assembly 10 wherein the input shaft 28 and the output shaft 14 are offset and project into and out of the plane of the page. In this figure, "A" represents the input torque on the roller ring 24 as delivered by the roller ring input shaft 28. This clockwise torque "A" will drive the curtate epitrochoid cam 12 in a clockwise direction resulting in a reduced output torque "B" which is transferred to the output shaft 14. Because there are more roller elements 26 on the input roller ring than teeth on the cam 12, this configuration represents an overdrive transmission in which a 0.67 turn on the input shaft 28 results in 1.0 turn of the output shaft 14. The pitch circle of the cam 12 and roller ring 24 are represented by the circles labeled 21 & 31 respectively. The pitch circles contact and turn on each other without slipping at the 12 o'clock position. The pitch of the cam 12 and the roller ring 24 is represented by the value of "X" where the indicated radii cross the pitch circle 21 of the cam 12. Reference 27 is intended to indicate that the rollers can consist essentially of a sleeve with a bushing for high loading or any of a variety of commercially available cantilevered rollers with internal roller bearings for lower load applications and reduced frictional losses. These designs do not exclude the use of rollers with end supports. In this disclosure, end supports are not included in the drawing to simplify the figures and the visualizations of the designs.

Upon closer inspection of FIG. 1, the range of roller pin 26 interactions with the cam 12 is apparent. The cam position 22 depicts the initial contact or driving interaction between the roller pin 26 and the cam tooth 30. Similarly, the cam position 20 shows the final contact region between the cam tooth 30 and the roller pin 26. The interaction between the roller pin and a curtate epitrochoid cam is fairly complex and will be explained in detail by referring to FIG. 8b. Briefly, the interacting roller pin makes several transitions from driving 22 to holding 17 to a neutral or nodal position 18 back to a driving position 19 and to a final holding interaction in position 20. Such intricate interactions are not obvious upon a casual scanning of the figures.

Figure 2:
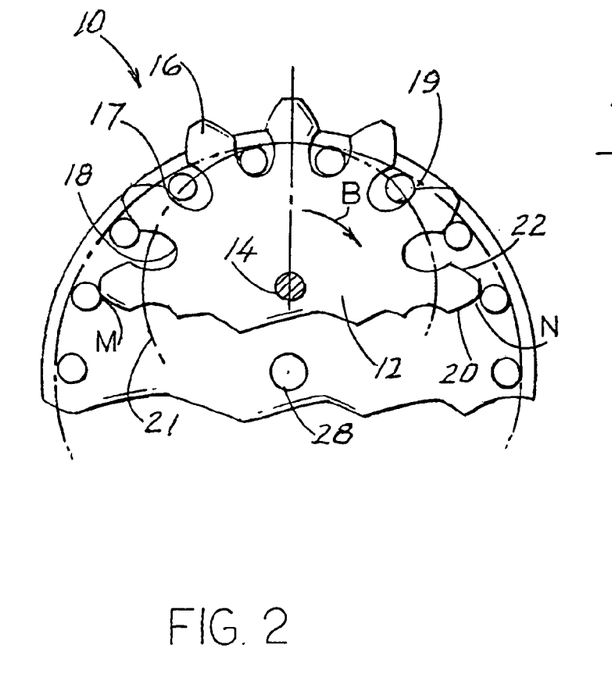
FIG. 2 is the same view as FIG. 1, in partial section, showing a one-half pitch clockwise displacement from FIG. 1.

FIG. 2 depicts the roller cam assembly rotated one-half X or one-half pitch from the position shown in FIG. 1. Note the positions M and N, which represent the initial and final positions of roller pin 26 interaction with cam 12. When FIGS. 1 and 2 are conceptually combined, a better appreciation of the roller pin 26 and cam 12 interaction is realized. Note the displacement of the roller pin centers inside the pitch circle of the cam 21. This radial displacement is a controlling factor in dictating the curtate epitrochoidal cam profile shown in FIGS. 1 and 2. This displacement inside 31 is defined by the term epsilon in the curtate epitrochoid profile-defining equations, infra.

Figure 3:
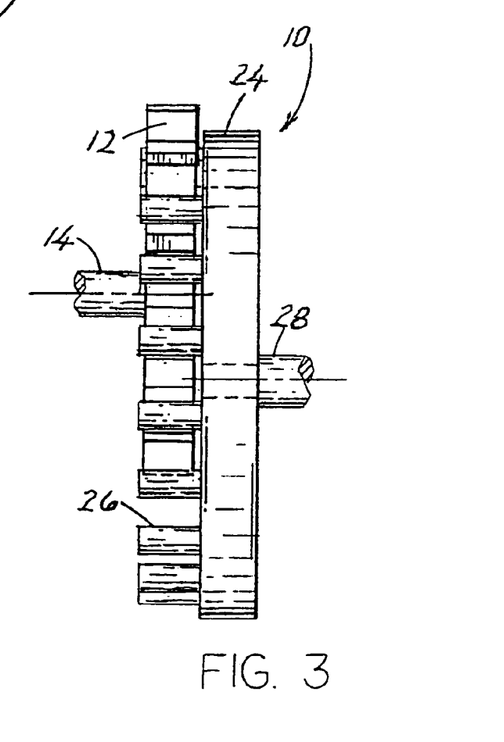
FIG. 3 is an elevated side view of FIG. 1 after rotating the roller cam assembly 90° in the horizontal plane.

FIG. 3 offers a longitudinal perspective wherein the roller cam assembly 10 in FIG. 1 has been rotated 90° in the horizontal plane such that the cam shaft 14 and the roller ring shaft 28 are now in the plane of the page. The compactness of this curtate epitrochoid cam and roller ring design is clearly seen in this view.

Figure 5:
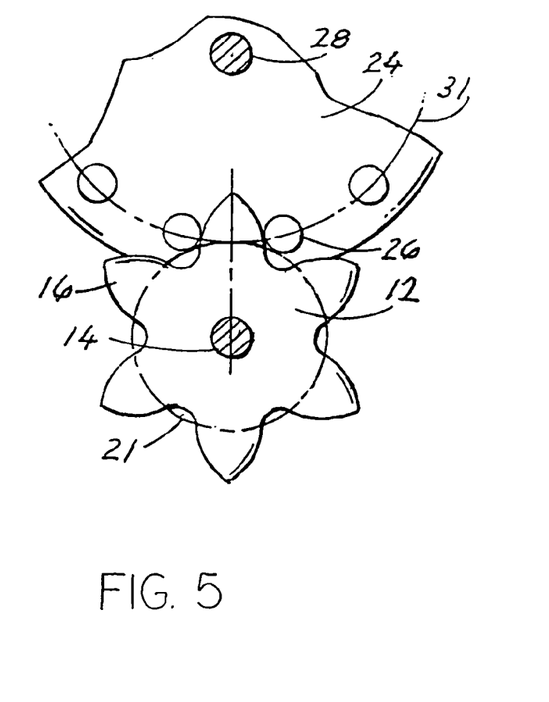
FIG. 5 is the same view as FIG. 4, in partial section, but showing a one-half pitch deviation from FIG. 4.
Figure 6:
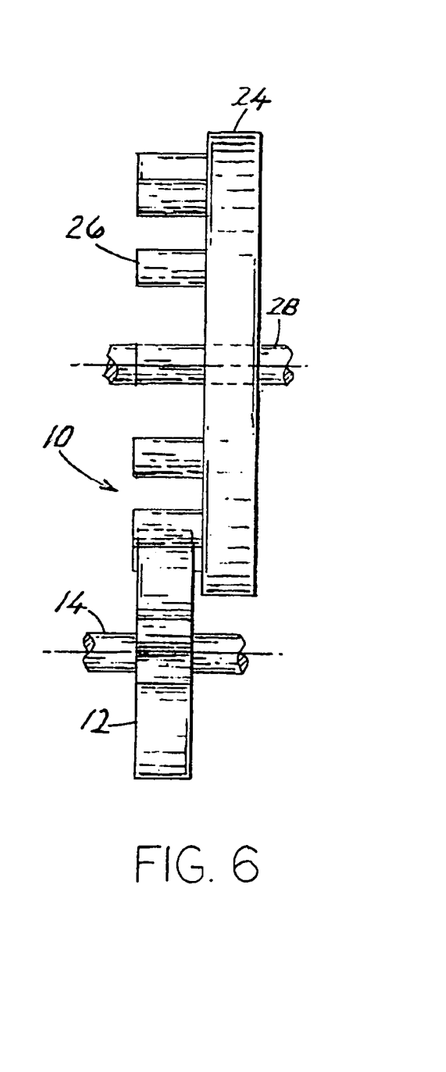
FIG. 6 is an elevated side view of FIG. 4 after rotating the roller cam assembly rotated 90° in the horizontal plane.

FIGS. 4, 5, & 6 represent a series of views parallel to FIGS. 1, 2, & 3 except that the cam design is a prolate epitrochoid type and the cam axis is located outside the circumference of the roller ring assembly 24. FIG. 4 is an axial view of a prolate epitrochoid cam and roller ring assembly 10 wherein the input shaft 14 and the output shaft 28 are offset and project into and out of the plane of the page. In this figure "A" represents the input torque on the cam 12 as delivered by the input cam shaft 14. This clockwise torque A will drive the roller ring assembly 24 in a counter clockwise direction resulting in a increased output torque "B", which is transferred to the roller ring output shaft 28. Because there are more roller elements 26 on the output roller ring than teeth on the input cam 12, this configuration represents a transmission in which 1.0 turn on the input shaft 14 results in 0.5 turn of the output shaft 28. The pitch circles of the cam 12 and roller ring 24 are represented by the circles labeled 21 & 31 respectively. The pitch circles contact and turn on each other without slipping at the 6 o'clock position of the cam. Note that the roller pin centers are displaced inwardly from the roller ring pitch circle 31 or outward from the pitch circle of the cam 21. This inward displacement of the roller pin centers from the roller ring pitch circle is similarly the controlling factor for defining the prolate epitrochoid cam profile. This displacement is defined as epsilon in the prolate epitrochoid defining equations infra. The pitch of the cam 12 and the roller ring 24 is designated by the value "X" as measured along the pitch circle.

Figure 4A:
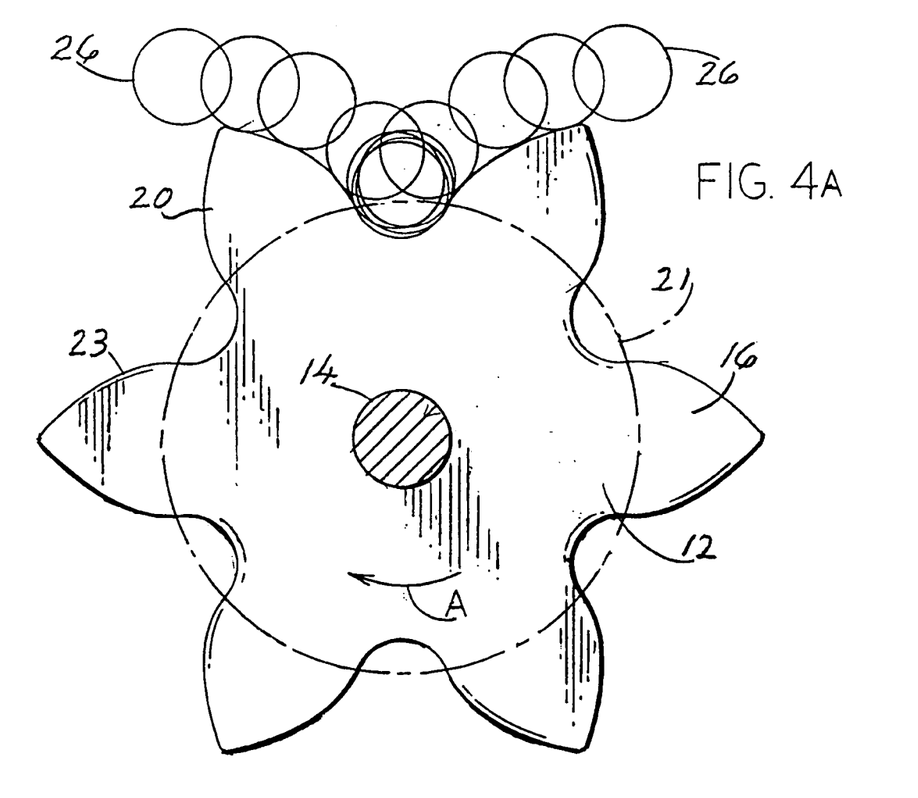
FIG. 4a is an enlarged view of the epitrochoid cam of FIG. 4 showing the strobbed motion of a solitary roller's relative motion across the face of the cam.
Figure 4B:
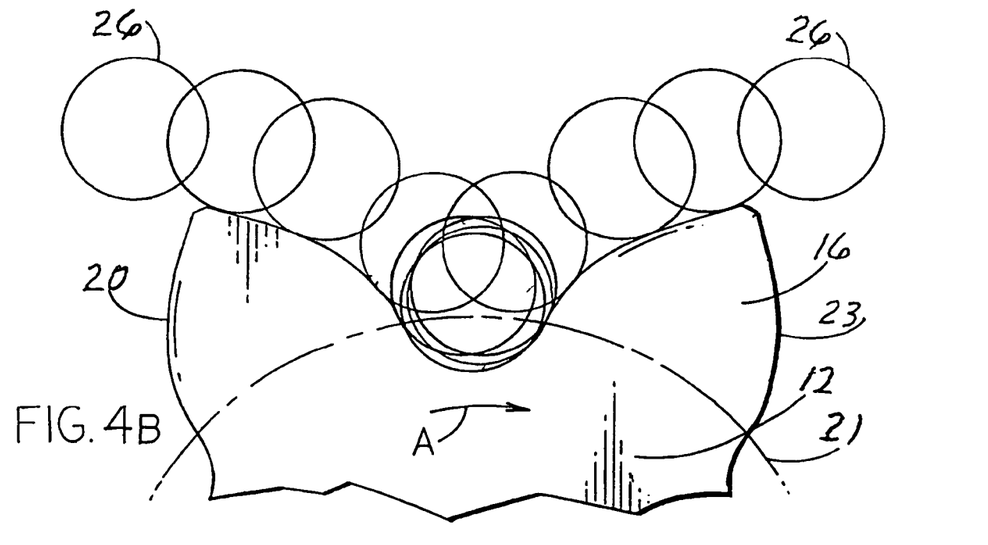
FIG. 4b is a further enlargement of a single pitch of the cam of FIG. 4a, which more clearly depicts how the profile of the cam perfectly matches the relative motion of the roller.

FIGS. 4a and 4b clearly show that the profile of the prolate epitrochoid cam is such that it completely defines the relative motion of the roller pin center across the cam. In this view the cam is held in place and the roller ring pitch circle is rotated around the cam pitch circle. From the beginning to the end of the pitch cycle, the roller pin 26 is in continuous contact with the cam 12.

In contrast to the curtate epitrochoid cam (FIGS. 1–3), the initial roller contact at position (O) FIG. 4 of the driving prolate epitrochoid cam 12 (also see FIGS. 4–6) provides a holding action as opposed to a driving action. Similarly, the final interaction of the driving prolate epitrochoidal cam with the roller ring 24 is a driving contact (see FIGS. 4, 4a, & 4b). Halfway between positions O and P is a neutral or nodal point in the roller pin's interaction with the cam (see FIG. 4). At the neutral position the cam is not driving or holding back the roller pin. In FIG. 4 the driving face of the cam tooth 16 and the holding face of the cam tooth are identified by 22 and 20, respectively.

The contacting pitch circles of the cam and roller ring are represented by the circles labeled 21 and 31, respectively. Note that the roller pin centers are displaced inwardly from the roller ring pitch circle 31 or outward from the pitch circle of the cam 21. This inward displacement of the roller pin centers from the pitch circle is similarly the controlling factor for defining the prolate epitrochoid cam profile. This displacement is defined as epsilon in the prolate epitrochoid defining equations, infra.

FIG. 5 illustrates an alternate view of FIG. 4 wherein the cam has been rotated clockwise one-half pitch. In FIG. 5 the unique feature of prolate epitrochoid cams is clearly revealed by showing that the single engaged cam tooth is simultaneously driving and holding the roller ring and minimizing back-lash by holding back the next roller pin to be driven. An advantage in this design is the minimization of the intermittent motion which is more likely with involute gear designs.

FIG. 6 gives a longitudinal perspective wherein the roller cam assembly 10 in FIG. 4 has been rotated 90° so that the cam shaft 14 and the roller ring shaft 28 are now in the plane of the page.

Figure 7:
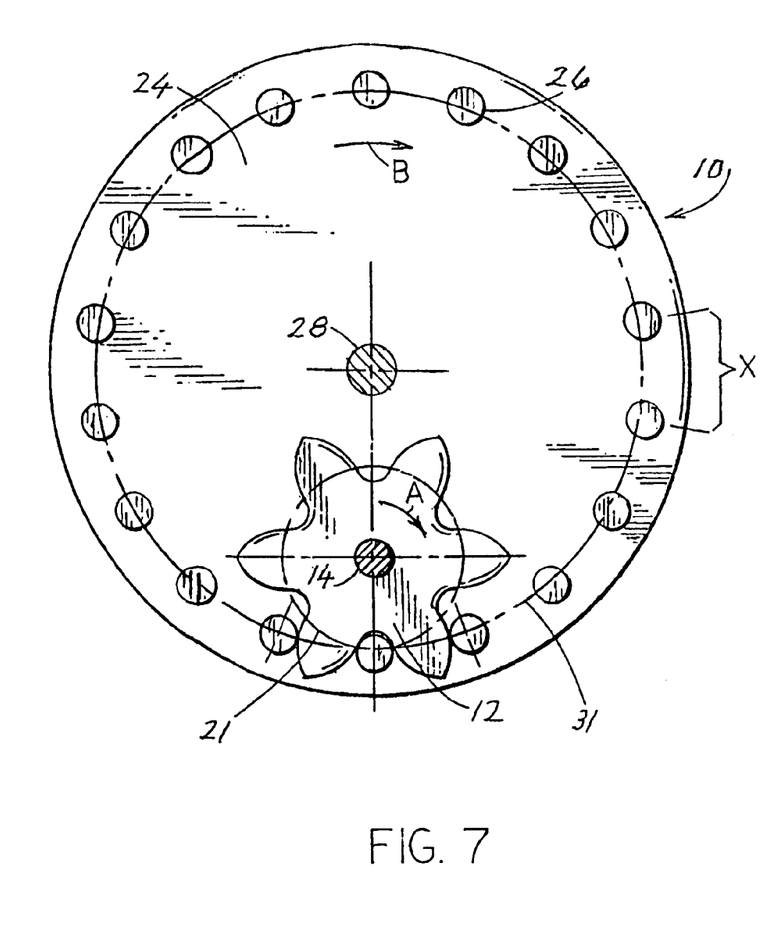
FIG. 7 is an elevated axial view of a prolate epitrochoidal cam and roller assembly wherein the axle of the cam is located inside the pitch circle of the roller ring.
Figure 8:
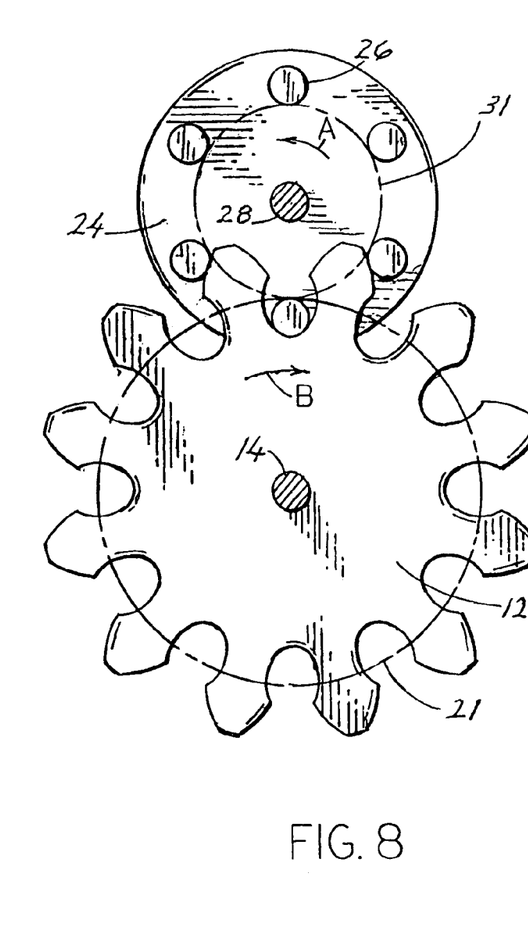
FIG. 8 is an elevated axial view of a curtate epitrochoidal cam and roller assembly wherein the axis of the cam is external to the pitch circle of the roller ring.

FIGS. 7 & 8 show that the roller ring-epitrochoid cam relationships described in FIGS. 1–3 and FIGS. 4–6 can be reversed with respect to the location of the cam shaft, viz. the same cam can work with two unique roller rings. The roller rings are clearly different depending on whether the cam is located inside or outside of the roller ring's circumference. Compare FIGS. 4 & 7 and 1&8.

Figure 8A:
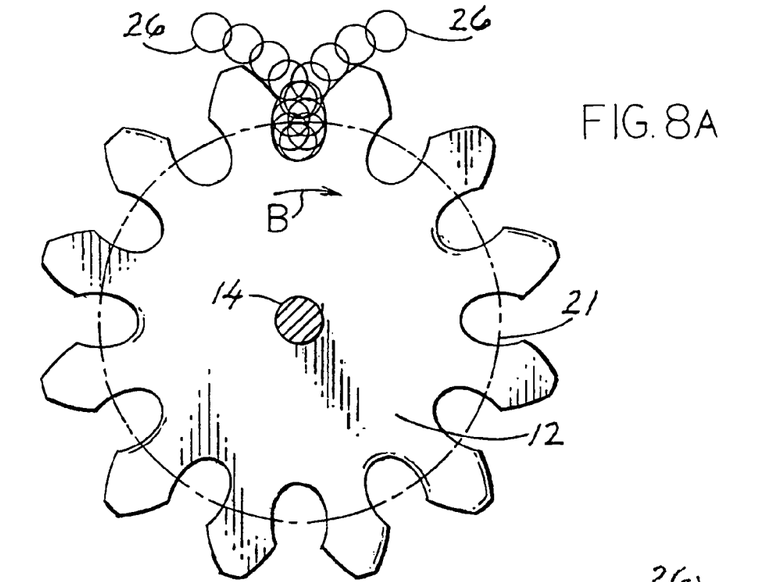
FIG. 8a is the is the curtate epitrochoid cam of FIG. 8 showing the incremental motion of a solitary roller's relative motion across the face of the cam.
Figure 8B:
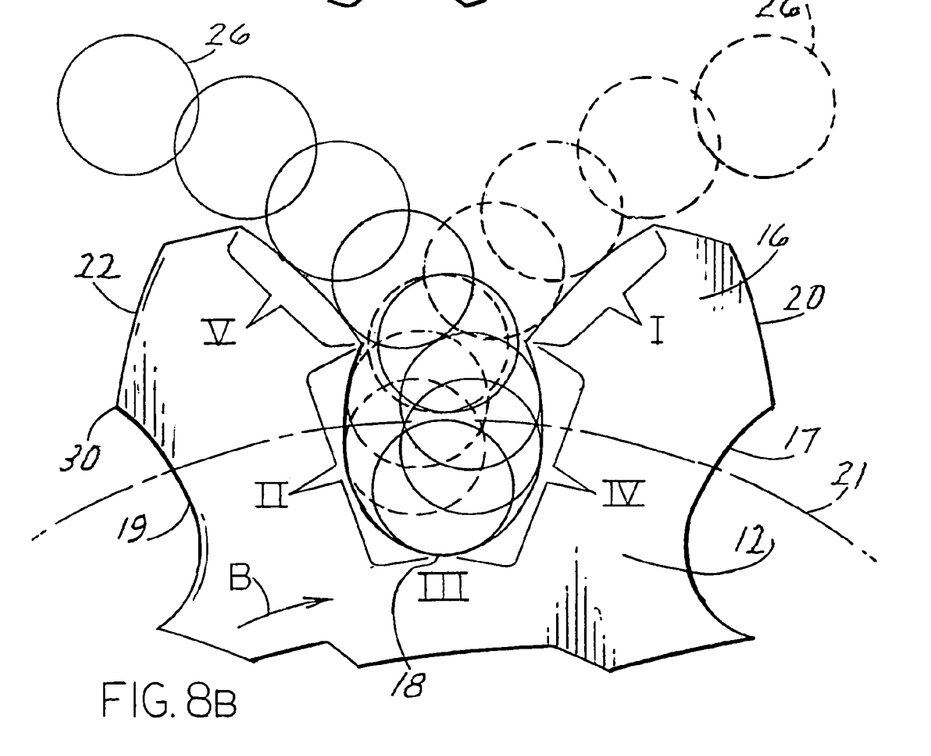
FIG. 8b is an enlarged view of a single pitch of the cam of FIG. 8 depicting subsections (I–V) of the roller's interaction with the cam.

FIGS. 8A and 8B show close-up and extreme close-up views of the incremental motion of an individual roller pin 26 across the curtate epitrochoid cam 12 in FIG. 8. This motion can be duplicated by holding the cam still and rotating the roller ring around the cam at a distance equal to the sum of the cam and roller ring pitch circle radii. In these figures the cam is rotating with a clockwise driving torque B. With the curtate epitrochoid cam, the relative motion of the roller pin across the cam is not intuitively obvious. Therefore, this motion is shown in extreme close-up with the phases of roller cam contact indicated by Roman numerals I–V (FIG. 8B). The initial roller pin 26 and cam contact takes occurs along a holding face of the cam tooth 22 designated phase I. The roller pin then departs from the initial contact tooth at a point designated 30 and then traverses the notch and contacts the next cam tooth on a driving face 17 designated phase II. Driving occurs during phase II as the roller traverses down the cam tooth until the roller reaches the bottom of the tooth or the notch 18, designated phase III. At this point the roller is not driving or holding. It is in a nodal position. During phase IV the roller traverses up the holding cam face 19 until it reaches position 30. At this point the roller ceases its holding action and again traverses the notch and contacts another driving face of the adjacent cam tooth. This final driving phase is designated phase V. We call this unique motion across the cam a "gamma motion" after the Greek character that it simulates. This complex motion with two phases of driving and two phases of holding within a single pitch cycle has not been described before and enables this design to dramatically reduce intermittent action. Normally, more than one roller contacts the cam in a given instance and thus holding and driving phases on adjacent cam teeth and rollers are overlapping. This overlap minimizes intermittent action in these cam and roller ring designs. Other designs that have claimed to eliminate intermittent action have required continuous contact between a rolling elements and the cams to achieve this end (Distin et al. U.S. Pat. No. 4,584,904).

Figure 9:
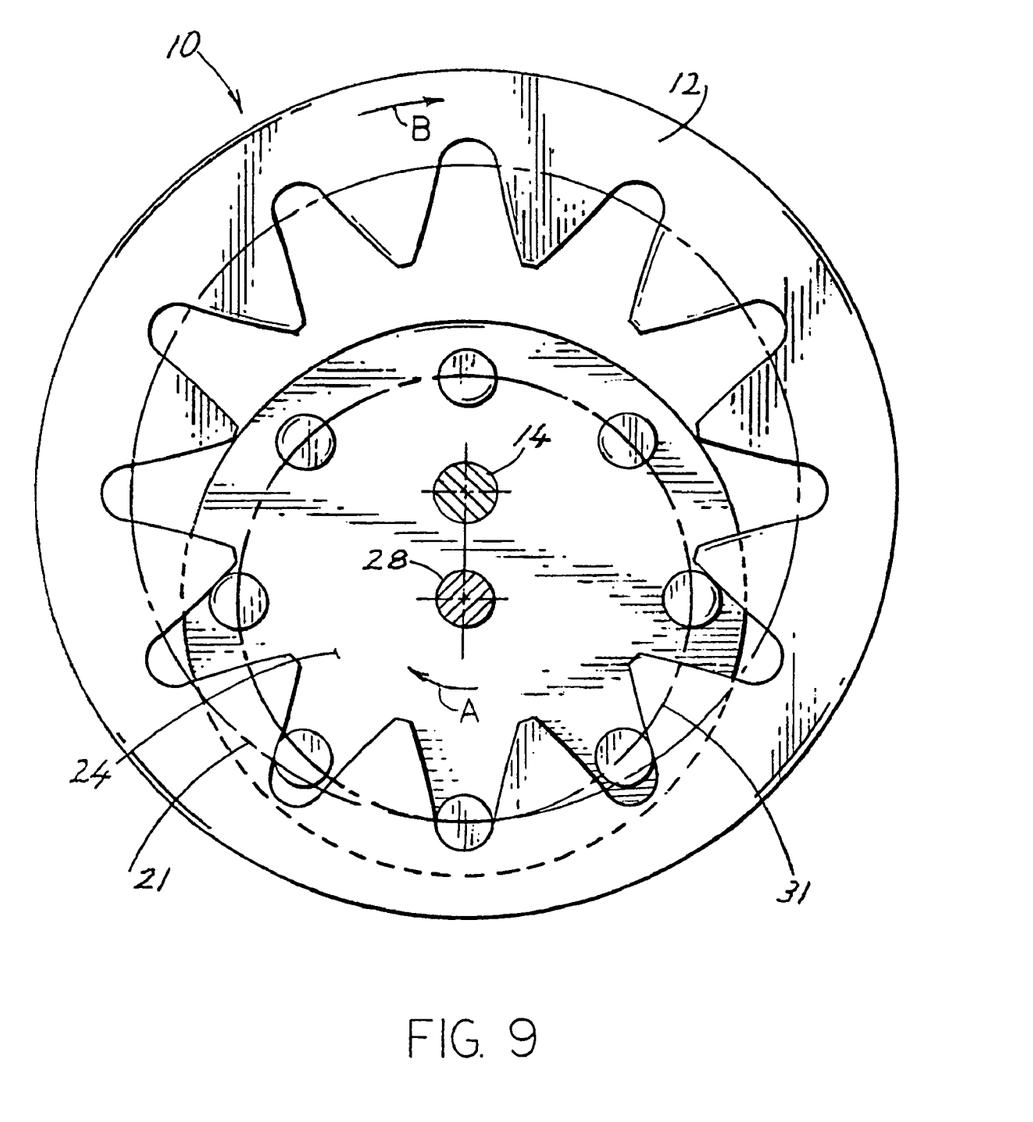
FIG. 9 is an elevated axial view of a prolate hypotrochoid cam and roller ring assembly.

FIG. 9 illustrates a second form of roller cam assembly 10, namely the prolate hypotrochoid cam design. With hypotrochoid cams the roller ring assembly 24 is contained within, or surrounded by, the cam 12. In this figure the roller ring shaft 28 is the input shaft imparting a torque "A" to the roller ring assembly. This action applies a torque "B" to the cam 12, which is attached to shaft 14, and is 1.5 times greater than "A". In an identical fashion to the prolate epitrochoid cam (see FIG. 4B and its description). This hypotrochoid cam provides an initial holding action upon first contact with the roller ring and a driving action following the nodal position at six o'clock in FIG. 9. Consequently, this hypotrochoid design also has all the benefits of the prolate epitrochoid cam-roller ring design such as reduced friction, eliminated interference, and minimized intermittent action. The circles labeled 31 and 21 represent the pitch circles of the roller ring and cam respectively.

Figure 10:
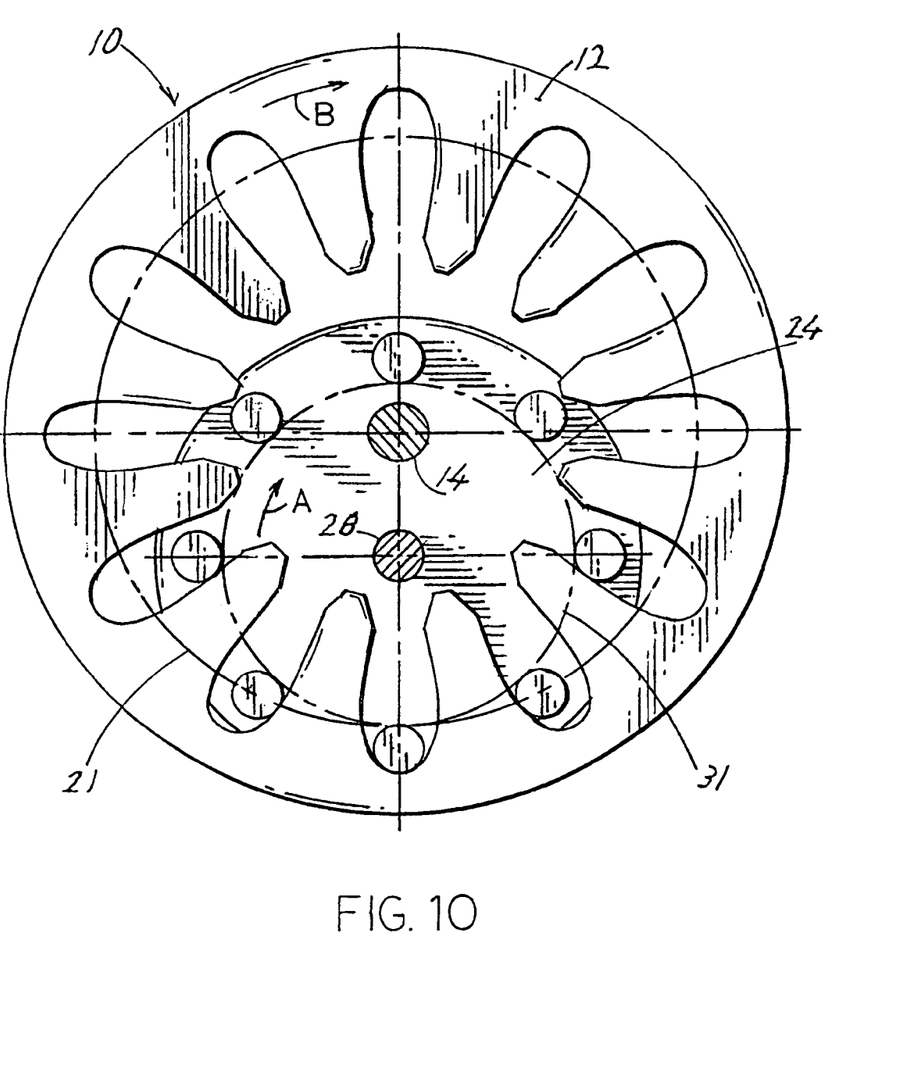
FIG. 10 is an elevated axial view of a curtate hypotrochoid cam and roller ring assembly.

FIG. 10 appears quite similar to FIG. 9 because it also is a hypotrochoid cam roller ring assembly. However the centers of the rollers are displaced in a radial fashion outside the pitch circle of the roller ring 31 by an amount $\epsilon$. This difference manifests itself on the shape of the cam, requiring it to be a curtate hypotrochoid in order to control the relative motion of the roller ring as it interacts with the cam as described in FIG. 8B.

FIGS. 11 & 12 simply extend these hypotrochoid cam and roller ring assemblies into an epicyclic design wherein the roller ring is mounted on an eccentric shaft of displacement Y (eccentricity) as it rotates around its axis 33. Also note that in FIGS. 11 and 12 the cams are fixed, and the eccentric and the roller ring rotate in opposite directions. As shown in previous epicyclic gear designs these designs can provide massive gear train values with correspondingly large torque multiplication. The epicyclic hypotrochoid roller cam assemblies and epicyclic epitrochoid roller cam assemblies shown in FIGS. 11 and 12 ideally handle these high train values and high torque values. The stout cam tooth profiles provide significant strength advantages over conventional involute gears. Furthermore, all the designs portrayed in this document avoid a point of zero radius of curvature, which is inherent in cycloids.

Figure 13:
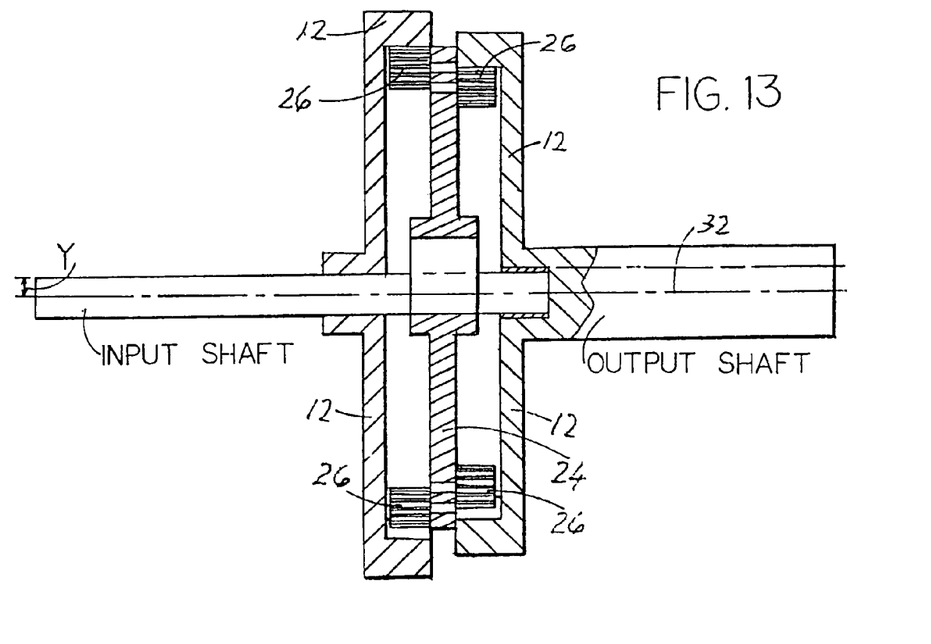
FIG. 13 is a two-stage hypotrochoidal reverted epicyclic roller ring assembly wherein the input and output shafts are in the plane of the page.
Figure 14:
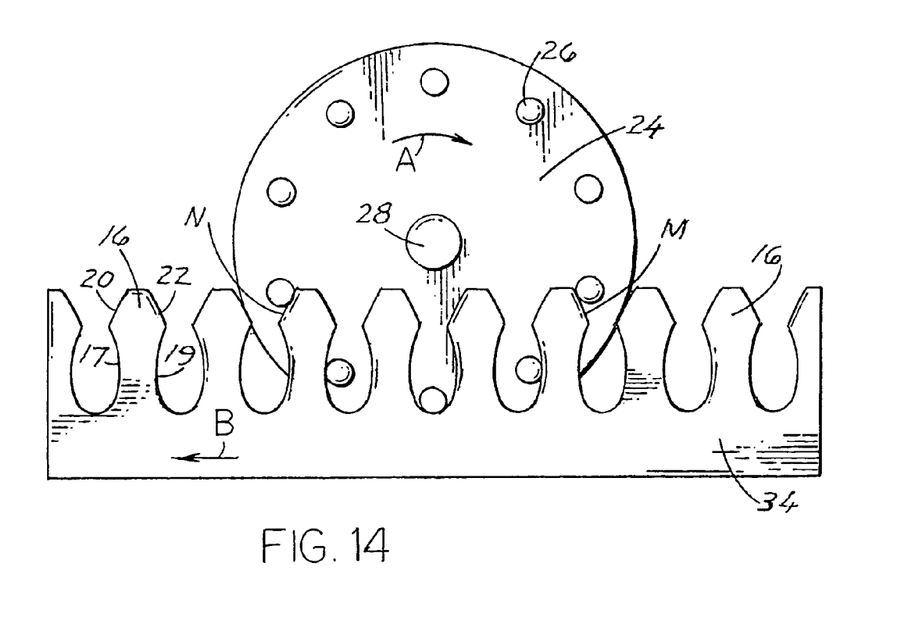
FIG. 14 is a curtate trochoidal cam roller ring assembly that changes rotary motion into linear motion

FIGS. 11 & 12 are intended to be first stages of a two-staged epicyclic configuration. In a two-staged configuration the second stage is in tandem and mirrors the first stage FIG. 13. Please note that the first stage cam is part of the housing, and also note that the roller rings of both stages are firmly attached to each other and that the second stage cam is free to rotate. The out put shaft, which is firmly attached to the second stage cam, provides the output torque. This arrangement will also work for epitrochoidal cams. The second stage can be slightly larger or smaller with the planetary roller rings connected. The second stage cam is free to rotate around an output shaft that lines up with the input shaft. These types of staged epicyclic transmissions can provide very high train values with reduced rotational mass and compact size.

As an intuitive proof of concept a mechanical means of producing the epitrochoid cams in FIGS. 4 & 8 will be presented: We begin with two parallel shafts, such as 14 and 28 of FIGS. 4 & 8, spaced as depicted in the figures. On shaft 14, we install a gear blank of sufficient size to accommodate cam 14. On shaft 28, we install cylindrical cutters of the size and placement as the rollers on roller ring 24. Imagine that the cutters have cutting teeth on their sides and ends, such as cutters for end mills. Shafts 14 & 28 are then connected by two spur gears having identical pitch circles 31 and 21. The cutters, or the cam blank, are/is connected to the shaft through splines so that they may be moved axially along the shaft, and they are positioned so that the end mill cutters face the perpendicular plane of the gear blank. With the cutters spinning and the shafts rotating, the cutters are brought into the same perpendicular plane as the gear blank. The resulting cam shape will be that of cam 12 in FIGS. 4 & 7. The same cam shape can also be generated having the cutters arranged the same as the rollers on roller ring 24 in FIGS. 1 and 8. This method would also work for hypotrochoidal cams such as those in FIGS. 9 & 10.

In practice, holding the shaft of the roller ring 24 containing the cutters and rotating the "arm" between shafts 14 and 28 in an epicyclical manner, gives the same relative motion as described above and would generate cams having the same shape.

EQUATIONS

The equations that define the motion of the centers of the roller pins across the epitrochoid cams are derived from the equations defining epicyclical motion. In a book entitled: *Mechanical design and Systems Handbook* edited by Harold A. Rothbart (McGraw-Hill, New York, 1964) the equation for epicycloid motion is:

$$x = (a+b)\cos\phi - b\cos\frac{(a+b)}{b}\phi$$

$$y = (a+b)\sin\phi - b\sin\frac{(a+b)}{b}\phi$$

See page 1-53 for the definitions of the variables. To define the prolate epitrochoid motion a variable $\epsilon$ is added to the equations infra. $\epsilon$ represents an incremental displacement of the generating point(s) for the cam off the pitch circle of the roller ring assembly towards the center of the roller ring. Thus, the equation for the prolate epitrochoid motion produce by the similarly named cam becomes:

$$x = (a+b)\cos\phi - (1-\varepsilon)b\cos\frac{(a+b)}{b}\phi$$

$$y = (a+b)\sin\phi - (1-\varepsilon)b\sin\frac{(a+b)}{b}\phi$$

Since the curtate epitrochoid cam is generated when the centers of the roller ring are displaced outside the pitch circle of the roller ring, the equation defining this motion becomes:

$$X = (a+b)\cos\phi - (1-\varepsilon)b\cos\frac{(a+b)}{b}\phi$$

$$y = (a+b)\sin\phi - (1-\varepsilon)b\sin\frac{(a+b)}{b}\phi$$

In a similar manner the equations defining hypotrochoid motion are derived from those equations describing hypocycloidal motion. Again according to Rothbart p1-53 those equations are:

$$x = (a-b)\cos\phi + b\cos\frac{(a-b)}{b}\phi$$

$$y = (a-b)\sin\phi - b\sin\frac{(a-b)}{b}\phi$$

Again, by amending the above equations with the value $\epsilon$ we can define the prolate hypotrochoid motion as:

$$x = (a-b)\cos\phi + (1-\varepsilon)b\cos\frac{(a-b)}{b}\phi$$
$$y = (a-b)\sin\phi - (1-\varepsilon)b\sin\frac{(a-b)}{b}\phi$$

Similarly, we can define curtate hypotrochoid motion as follows:

$$x = (a-b)\cos\phi + (1-\varepsilon)b\cos\frac{(a-b)}{b}\phi$$
$$y = (a-b)\sin\phi - (1-\varepsilon)b\sin\frac{(a-b)}{b}\phi$$

While the foregoing is a complete and detailed description of the preferred embodiments of the disclosed roller cam assembly, it should be apparent that numerous variations and modifications can be employed to implement the all-important purpose of the assembly without departing from the spirit of the invention, which is fairly defined by the appended claims.

What is claimed is:

1. A non-orbital, non-epicyclic transmission, comprising:
   (a) a first shaft, said first shaft comprising a first axis;
   (b) a roller ring rigidly attached to said first shaft, the roller ring comprising:
      (i) a member having a ring circumference defining an outer perimeter of said member, said ring circumference encircling a ring center,
      (ii) a plurality of roller pins attached to said member, wherein said roller pins are equidistantly circumferentially spaced relative to each other, wherein each roller pin has a pin axis, wherein each pin axis is equidistantly positioned at a first distance from said first axis, and
      (iii) a ring pitch circle having a ring pitch circle radius and a ring pitch circle circumference, wherein said ring pitch circle is centered on said first axis,
      wherein said roller ring is configured to rotate unitarily with said first shaft, said first axis providing an axis of rotation for said roller ring and said first shaft, wherein said ring center lies along said first axis;
   (c) a second shaft, said second shaft comprising a second axis; and
   (d) a cam rigidly attached to said second shaft, the cam comprising:
      (i) a cam pitch circle, and
      (ii) a plurality of teeth, said teeth having a trochoidal profile, wherein said teeth are configured to mesh with said roller pins,
      wherein said cam is configured to rotate unitarily with said second shaft, said second axis providing an axis of rotation for said cam and said second shaft, wherein each of said teeth has at least one radially outermost point with respect to said second axis;
   wherein said roller ring and said cam are configured to transfer torque from one of said shafts to the other of said shafts via interaction between said roller pins and said teeth.

2. The transmission of claim 1, wherein said second shaft is an input shaft, and said first shaft is an output shaft.

3. The transmission of claim 1, wherein said second axis is positioned outside of said ring circumference.

4. The transmission of claim 1, wherein said cam pitch circle and said ring pitch circle are in contact.

5. The transmission of claim 1, wherein said trochoidal profile is curtate hypotrochoidal.

6. The transmission of claim 1, wherein said trochoidal profile is prolate hypotrochoidal.

7. The transmission of claim 1, wherein said trochoidal profile is curtate epitrochoidal.

8. The transmission of claim 1, wherein said trochoidal profile is prolate epitrochoidal.

9. The transmission of claim 1, wherein at least a portion of each of said roller pins is rotatable about its respective pin axis.

10. The transmission of claim 1, wherein the distance between said first axis and said at least one radially outermost point of at least one of said teeth is greater than said first distance.

11. The transmission of claim 1, wherein the number of roller pins exceeds the number of teeth.

12. The transmission of claim 1, wherein said cam is positioned with respect to said roller ring such that at least a portion of said cam pitch circle is inside said ring pitch circle.

13. The transmission of claim 12, wherein said cam pitch circle and said ring pitch circle are in contact.

14. The transmission of claim 1, wherein the interaction between each of said roller pins and said teeth during contact between each of said roller pins and said teeth during said torque transfer comprises holding, neutral, and driving.

15. The transmission of claim 14, wherein said interaction further comprises two driving phases and two holding phases for each of said roller pins.

16. The transmission of claim 1, wherein said ring pitch circle radius is greater than said first distance.

17. The transmission of claim 1, wherein one of said teeth, during interaction between said one of said teeth and said roller pins, simultaneously drives one of said roller pins and holds another of said roller pins during torque transfer.

18. The transmission of claim 1, wherein each pin axis moves in a gamma motion during the interaction between the roller pin corresponding to said each pin axis and said teeth during said torque transfer.

19. A rack and pinion transmission, comprising:
   (a) a first shaft, said first shaft comprising a first axis;
   (b) a pinion comprising a roller ring rigidly attached to said first shaft, the roller ring comprising a member and a plurality of roller pins attached to the member, wherein said roller pins are equidistantly circumferentially spaced relative to each other, wherein each roller pin has a pin axis, wherein each pin axis is equidistantly positioned at a first distance from said first axis, and wherein said roller ring is configured to rotate unitarily with said first shaft; and
   (c) a rack comprising a plurality of teeth, said teeth having a curtate trochoidal profile, wherein said teeth are configured to mesh with said roller pins;
   wherein said rack and said pinion are configured to transmit force between said first shaft and said rack via interaction between said roller pins and said teeth.

20. The rack and pinion of claim 19, wherein said first shaft is an input shaft.

* * * * *